Patented Jan. 16, 1951

2,538,687

UNITED STATES PATENT OFFICE 2,538,687

INSECTICIDAL COMPOSITION COMPRISING 1-p-CHLOROPHENYL-2-NITRO-1-TOLYL-PROPANE

Henry B. Hass, West Lafayette, Ind., and Maynard B. Neher, Athens, Ohio, assignors to Purdue Research Foundation, La Fayette, Ind., a corporation of Indiana No Drawing. Application February 19, 1948, Serial No. 9,632

5 Claims. (Cl. 167—30)

Our invention relates to insecticidal compositions and is particularly concerned with materials adapted for combating flies, the Mexican bean beetle, and other common insect pests. More particularly, it relates to the use of 1-p-chlorophenyl-2-nitro-1-p-tolylpropane as an active ingredient in such compositions, and to methods of producing 1-p-chlorophenyl-2-nitro-1-p-tolylpropane.

Many materials and classes of materials have in the past been recommended as insecticides, fungicides, pesticides, and the like. The great majority of these, however, have been impractical for various reasons including availability, cost, impractical physical characteristics such as odor, undesirable effects on the pest host or other object with which the product comes in contact, difficulty and danger of application, etc. Of equal, if not greater importance is the high degree of selectivity possessed by many products of this character. For example, a particular agent may be especially effective against one or two insects but have no harmful action whatsoever on any other when applied in practical quantities. Also, particular insects are found to be resistant to almost every kind of insecticidal compound of practical utility known. Even closely related chemical compounds often have widely different effects upon both pests and their hosts, with the result that a new material or type of material must be tested under conditions simulating those of actual use before its utility can be determined.

The efficacy of an insecticidal composition against house flies is usually measured in terms of its "knock-down" or per cent "kill." Some insecticides possess both properties in varying degrees and hence the use to be made of a given material should be known in order to permit the selection of the proper material or combination of materials. For example, pyrethrum has the property of producing a high degree of knock-down, but many of the insects immobilized ultimately recover. Other materials, such as dichlorodiphenyltrichloroethane, commonly noted as D. D. T., have high per cent kill but are relatively low in knock-down and hence, their action is not so quickly seen. For the latter reason it is sometimes found desirable to combine an agent with a high per cent kill with another having high knock-down.

We have now discovered a compound, namely, 1-p-chlorophenyl-2-nitro-1-p-tolylpropane, which possesses the property of high per cent kill for certain types of insects, e. g., the common housefly, and more important still, the Mexican bean beetle for which there has previously been no entirely satisfactory killing agent. As will be shown below, 1-p-chlorophenyl-2-nitro-1-p-tolylpropane is highly effective against this important pest at very low concentrations and with substantially no harm to the host, thus making our discovery unusually important from the point of view of practical utility. In addition, when used against house flies, it possesses knock-down properties comparable with those of the aliphatic thiocyanate known as "Lethane," commonly accepted at the present time as a standard commercial knock-down agent.

The 1-p-cholorophenyl-2-nitro-1-p-tolylpropane of our invention may be prepared as follows: Six hundred and fifty milliliters of 85% sulfuric acid was cooled in an ice bath and then 260 g. of toluene added thereto. The resulting mixture was stirred until the temperature dropped below 10° C. and then 200 g. of 1-p-chlorophenyl-2-nitro-1-propanol added at such a rate that the temperature was maintained below 10° C. After the addition was complete the ice bath was removed and stirring continued at room temperature for four or five hours. The resulting mixture was then poured over cracked ice and extracted with ether. The ethereal layer was then removed in a separatory funnel, treated with solid sodium bicarbonate to remove sulfuric acid that might be in suspension, and then evaporated on a steam plate. The resulting solid residue was then crystallized to give the desired 1-p-chlorophenyl-2-nitro-1-p-tolylpropane, having a melting point of 95–6° C. The crude product may be satisfactorily recrystallized from absolute ethanol. The yield of the desired product obtained by the procedure outlined above was 48%.

The 1-p-chlorophenyl-2-nitro-1-propanol used in the above condensation operation was obtained by condensing p-chlorobenzaldehyde with nitroethane. A convenient method of effecting this condensation is as follows: Four moles of p-chlorobenzaldehyde (562 g.) was stirred with a solution of 440 g. of sodium bisulfite in 2000 ml. of distilled water until the exothermic formation of the sodium bisulfite addition complex was complete, as shown by a drop in temperature. This took about 8 hours. The solution was cooled to room temperature by use of an ice bath. To this was then added a solution prepared by reacting 330 g. (4.4 moles) of nitroethane with 180 g. of sodium hydroxide in 800 ml. of water at such a rate that the temperature did not rise above 20° C. The resulting mixture was stirred for one hour and allowed to stand overnight. The resulting nitro alcohol settled to the bottom of the flask with a slurry of the sodium bisulfite-p-chlorobenzaldehyde complex. The solid material was removed by suction filtration and the organic material dissolved in ether and extracted several times with saturated sodium bisulfite solution to remove the unreacted p-chlorobenzaldehyde. The ether solution was dried with anhydrous sodium sulfate and the ether evaporated. The conversion of 1-p-chlorophenyl-2-nitro-1-propanol was 490 g., or 55%. After removal of the latter, the resulting 1-p-chlorophenyl-2-nitro-1-propanol may be further purified by distillation if desired.

The concentration of the sulfuric acid used in the above example may be varied from about 85 to about 95% with satisfactory results. Similarly, the condensation temperature may be allowed to rise to about 40° C. without materially reducing the yield of the desired product.

The exact quantity of 1-p-chlorophenyl-2-nitro-1-p-tolylpropane utilized in insecticidal compositions will be found to vary rather widely and to a certain extent depends upon the particular type of composition in which the material is being employed, the method of application, the nature of the insect pest to be controlled, and other factors commonly encountered in the insecticidal art. Since the material is relatively insoluble in some of the common solvents, this factor must also naturally be taken into consideration. As will be shown below, solubility in some instances may be increased by using a mixture of solvents in place of a single solvent. Generally speaking, however, concentrations ranging from about 0.5 to 2.0%, based upon the total weight of the finished insecticidal composition, give satisfactory results in fly spray compositions. When incorporated in a solid carrier such as "Pyrax," a ground pyrophyllite or ground aluminum silicate, concentrations ranging from 0.15 to 5.0 and even higher percentages may be employed.

As liquid vehicles or carriers we may employ "Ultrasene," or other like pure petroleum distillates or even commercial kerosene where odor is not too important a factor, or coal tar hydrocarbons such as xylene or toluene. At 0.5% concentration 1-p-chlorophenyl-2-nitro-1-p-tolylpropane is completely soluble in "Ultrasene" but a 1.0% concentration appears to be about the limit of its solubility in this particular solvent. However, by substituting 10% of n-butyl phthalate a concentration of 1.0%, or better, can be readily obtained and by substituting 10% of butyl carbitol for an equivalent amount of the "Ultrasene" the concentration of 1-p-chlorophenyl-2-nitro-1-p-tolylpropane can be increased to 2.0%. Other combinations may also be satisfactorily employed. As a solid vehicle we may employ any of the various forms of ground aluminium silicate commonly employed in insecticidal compositions, bentonite, fuller's earth, kieselguhr, kaolin, talc, and the like.

The effectiveness of 1-p-chlorophenyl-1-nitro-1-p-tolylpropane as a toxic agent against female houseflies was determined as follows. Adult flies reared in the laboratory under constant conditions were introduced into replicated spherical cages. Each cage was then placed on a revolving turntable and the flies subjected to an atomized spray delivered under constant pressure at the rate of 1.0 ml. per cage. Immediately after the flies in a cage were sprayed they were transferred to an observation cage in which they were maintained under constant conditions for twenty-four hours. At the end of that time the number of dead flies was counted. The table which follows shows the results obtained by testing various solutions and concentrations in the manner generally described above. The average per cent kill shown below is based upon several individual tests.

*Table I*

| Carrier | Per Cent Concentration of Toxicant | Average Per Cent Kill |
| --- | --- | --- |
| 100% "Ultrasene" | 0.5 | 74.9 |
| 90% "Ultrasene" 10% n-Butyl phthalate | 1.0 | 88.6 |
| 90% "Ultrasene" 10% Butyl carbitol | 2.0 | 97.0 |

The table given below gives the results of a series of experiments carried out to compare the knock-down properties of 1-p-chlorophenyl-2-nitro-1-p-tolylpropane, and various combinations thereof, with "Lethane," a commonly used knockdown agent in insecticidal compositions. In this instance, however, the test insects, female houseflies, were subjected to the action of uniform amounts of spray of different compositions and concentrations and the times observed when all of the flies in a given test had been knocked-down.

*Table II*

| Composition | Time in Minutes for 100% Knockdown |
| --- | --- |
| 5% "Lethane" in "Ultrasene" | 3 |
| 0.5% 1-p-Chlorophenyl-2-nitro-1-p-Tolylpropane in "Ultrasene" | 7½ |
| 1.0% 1-p-Chlorophenyl-2-nitro-1-p-Tolylpropane in "Ultrasene" | 3½ |

In order to show the effectiveness of 1-p-chlorophenyl-2-nitro-1-p-tolylpropane on other pests and when applied with solid inert carriers of the types referred to above, different quantities of the active insecticidal agent were uniformly mixed with the solid inert carrier and the dust thus obtained applied in uniform amounts to host plants to which the insects were then transferred. At the end of seventy two hours the percentage of dead insects was determined. Results of such tests are shown in Table III below.

*Table III*

| Per cent 1-p-Chlorophenyl-2-nitro-1-p-tolylpropane | Organism | Host | Per cent dead in 72 hours |
| --- | --- | --- | --- |
| 5% in "Pyrax" | Mexican bean Beetle Larvae | Black Hort. Bean | 100 |
| 1.25% in "Pyrax" | do | Cranberry Bean | 100 |
| 0.625% in "Pyrax" | do | do | 100 |
| 0.3125% in "Pyrax" | do | do | 93 |
| 0.15% in "Pyrax" | do | do | 47 |
| 5% in "Pyrax" | Larger milkweed bugs | | 25 |
| 1.25% in "Pyrax" | Adult wingless pea aphid | Windsor bean | 14 |

1-p-chlorophenyl-2-nitro-1-p-tolylpropane is also a highly effective mothproofing agent. A 0.062% solution in acetone was applied to strips of mohair woolen cloth which were then dried and subjected to attack by black carpet beetle larvae. In the standard test period of three weeks there was no feeding by the larvae, thus indicating complete mothproofing. The cloth remained normal in appearance.

In view of the data shown above, it can be seen that 1-p-chlorophenyl-2-nitro-1-p-tolylpropane possesses marked insecticidal activity. Also it may be utilized in conjunction with materials such as pyrethrum, rotenone, derris extract, nicotine, organic thiocyanates, and the like.

The insecticidal composition of our invention may be applied in a number of different ways. For example, it may be dissolved in kerosene or similar petroleum distillates with or without the addition of other toxicants and sprays. For use on plants, it may be dissolved in various plant spraying oils and emulsified in water to produce sprayable emulsions. Any of the common emulsifying agents utilized for such purposes can be employed in conjunction with these insecticidal compositions.

Now having described our invention, what we claim is:

1. An insecticidal composition containing, as the active insecticidal component thereof, 1-p-chlorophenyl-2-nitro-1-tolylpropane.

2. An insecticidal composition containing, as the active insecticidal component thereof, from about 0.15 to 5 per cent by weight of 1-p-chlorophenyl-2-nitro-1-tolylpropane.

3. The composition of claim 2 wherein the 1-p-chlorophenyl-2-nitro-1-tolylpropane is dispersed in a liquid petroleum distillate as a carrier.

4. The composition of claim 2 wherein the 1-p-chlorophenyl-2-nitro-1-tolylpropane is dispersed in a liquid coal tar hydrocarbon as a carrier.

5. The composition of claim 2 wherein the composition contains a ground aluminum silicate as a carrier.

HENRY B. HASS.
MAYNARD B. NEHER.

REFERENCES CITED

The following references are of record in the file of this patent:

UNITED STATES PATENTS

| Number | Name | Date |
|---|---|---|
| 2,397,802 | Muller | Apr. 2, 1946 |

Certificate of Correction

Patent No. 2,538,687                                                           January 16, 1951

HENRY B. HASS ET AL.

It is hereby certified that error appears in the printed specification of the above numbered patent requiring correction as follows:

Column 3, line 62, for "1-nitro-" read *2-nitro-*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*